US010171265B2

(12) United States Patent
Chen et al.

(10) Patent No.: US 10,171,265 B2
(45) Date of Patent: Jan. 1, 2019

(54) UPLINK CHANNEL INFORMATION

(71) Applicant: QUALCOMM Incorporated, San Diego, CA (US)

(72) Inventors: Chin-Hung Chen, Milpitas, CA (US); Ning Zhang, Saratoga, CA (US); Youhan Kim, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 15/260,144

(22) Filed: Sep. 8, 2016

(65) Prior Publication Data

US 2017/0134187 A1    May 11, 2017

Related U.S. Application Data

(60) Provisional application No. 62/253,576, filed on Nov. 10, 2015.

(51) Int. Cl.
| | | |
|---|---|---|
| H04L 25/02 | (2006.01) | |
| H04B 7/0413 | (2017.01) | |
| H04B 7/06 | (2006.01) | |
| H04L 27/26 | (2006.01) | |
| H04B 7/0452 | (2017.01) | |
| H04W 72/04 | (2009.01) | |
| H04W 84/12 | (2009.01) | |

(52) U.S. Cl.
CPC ....... *H04L 25/0202* (2013.01); *H04B 7/0413* (2013.01); *H04B 7/0452* (2013.01); *H04B 7/0617* (2013.01); *H04B 7/0619* (2013.01); *H04B 7/0626* (2013.01); *H04L 27/2601* (2013.01); *H04W 72/042* (2013.01); *H04W 72/0413* (2013.01); *H04W 84/12* (2013.01)

(58) Field of Classification Search
CPC ............ H04L 25/02; H04L 25/0202; H04L 25/03955; H04L 27/2601; H04B 7/04; H04B 7/0413; H04B 7/06; H04B 7/0617; H04B 2201/698; H04B 10/0775; H04B 10/0795; H04B 17/24; H04W 84/12; H04W 72/1273; H04W 72/1278; H04W 72/1284; H04W 72/1289; H04W 56/007
See application file for complete search history.

(56) References Cited

U.S. PATENT DOCUMENTS

| | | | |
|---|---|---|---|
| 2002/0058479 A1* | 5/2002 | Voyer | H04W 16/28 455/67.11 |
| 2011/0199946 A1 | 8/2011 | Breit et al. | |

(Continued)

OTHER PUBLICATIONS

International Search Report and Written Opinion—PCT/US2016/050983—ISA/EPO—dated Nov. 2, 2016.

*Primary Examiner* — Warner Wong
(74) *Attorney, Agent, or Firm* — Toler Law Group, P.C.

(57) ABSTRACT

A method for sending data includes receiving, at a first station of a plurality of stations, a trigger frame from an access point of a wireless network. The method also includes determining a downlink channel estimation based on the trigger frame and sending the downlink channel estimation to the access point. The method further includes receiving uplink channel data from the access point in response to sending the downlink channel estimation. The method also includes sending data to the access point based on the uplink channel data.

17 Claims, 8 Drawing Sheets

(56) References Cited

U.S. PATENT DOCUMENTS

| | | | |
|---|---|---|---|
| 2012/0147774 A1* | 6/2012 | Park | H04L 5/0035 370/252 |
| 2013/0083778 A1* | 4/2013 | Wang | H04L 1/0026 370/335 |
| 2014/0093005 A1* | 4/2014 | Xia | H04B 7/0617 375/267 |
| 2014/0328242 A1* | 11/2014 | Tong | H04W 48/00 370/312 |
| 2015/0085690 A1* | 3/2015 | Yi | H04L 25/0224 370/252 |
| 2015/0156794 A1 | 6/2015 | Kwon et al. | |
| 2015/0381328 A1* | 12/2015 | Mo | H04B 7/024 370/329 |
| 2016/0308624 A1* | 10/2016 | Rong | H04B 7/024 |
| 2017/0104659 A1* | 4/2017 | Suh | H04B 7/0619 |
| 2017/0134075 A1 | 5/2017 | Chen et al. | |
| 2017/0187430 A1* | 6/2017 | Moosavi | H04B 7/043 |
| 2017/0279505 A1* | 9/2017 | Zhang | H04B 7/26 |

* cited by examiner

UPLINK CHANNEL INFORMATION

I. CROSS REFERENCE TO RELATED APPLICATIONS

The present application claims the benefit of U.S. Provisional Patent Application No. 62/253,576, entitled "UPLINK CHANNEL INFORMATION," filed Nov. 10, 2015, which is expressly incorporated by reference herein in its entirety.

II. FIELD

The present disclosure is generally related to wireless communications.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Various wireless protocols and standards may be available for use by wireless telephones and other wireless devices. For example, Institute of Electrical and Electronics Engineers (IEEE) 802.11, commonly referred to as "Wi-Fi," is a standardized set of wireless local area network (WLAN) communication protocols. According to some Wi-Fi protocols, downlink sounding may be performed by an access point to enable downlink beamforming to one or more stations. As used herein, "downlink sounding" may correspond to an access point determining information related to a downlink channel based on feedback reports from a mobile station. For example, the access point may perform downlink sounding to determine downlink channel state information. In response to determining the downlink channel state information, the access point may send data to the one or more stations based on the downlink channel state information. However, stations transmitting data to the access point on the uplink may not be able to implement uplink beamforming because an uplink sounding signal is unavailable to the stations.

IV. SUMMARY

According to one implementation of the disclosed techniques, a method of determining uplink channel information includes sending a trigger frame from an access point of a wireless network to a plurality of stations in the wireless network. The method also includes receiving an uplink transmission from at least one station of the plurality of stations in response to sending the trigger frame. The method further includes determining uplink channel data based on the uplink transmission. The method includes sending the uplink channel data to the at least one station. The uplink channel data is usable by the at least one station to send data to the access point.

According to another implementation of the disclosed techniques, an apparatus includes a processor and a memory storing instructions that are executable by the processor to perform operations including sending a trigger frame from an access point of a wireless network to a plurality of stations in the wireless network. The operations also include receiving an uplink transmission from at least one station of the plurality of stations in response to sending the trigger frame. The operations further include determining uplink channel data based on the uplink transmission. The operations also include sending the uplink channel data to the at least one station. The uplink channel data is usable by the at least one station to send data to the access point.

According to another implementation of the disclosed techniques, a non-transitory computer-readable medium includes instructions for determining uplink channel information. The instructions, when executed by a processor, cause the processor to perform operations including sending a trigger frame from an access point of a wireless network to a plurality of stations in the wireless network. The operations also include receiving an uplink transmission from at least one station of the plurality of stations in response to sending the trigger frame. The operations further include determining uplink channel data based on the uplink transmission. The operations include sending the uplink channel data to the at least one station. The uplink channel data is usable by the at least one station to send data to the access point.

According to another implementation of the disclosed techniques, an apparatus includes means for sending a trigger frame from an access point of a wireless network to a plurality of stations in the wireless network. The apparatus also includes means for receiving an uplink transmission from at least one station of the plurality of stations in response to sending the trigger frame. The apparatus further includes means for determining uplink channel data based on the uplink transmission. The apparatus also includes means for sending the uplink channel data to the at least one station. The uplink channel data is usable by the at least one station to send data to the access point.

According to another implementation of the disclosed techniques, a method of sending data includes receiving, at a first station of a plurality of stations, a trigger frame from an access point of a wireless network. The method also includes performing a downlink channel estimation based on the trigger frame. The method further includes performing an uplink channel estimation based on the downlink channel estimation and sending data to the access point based on the uplink channel estimation.

According to another implementation of the disclosed techniques, an apparatus includes a processor and a memory storing instructions that are executable by the processor to perform operations including receiving, at a first station of a plurality of stations, a trigger frame from an access point of a wireless network. The operations also include performing a downlink channel estimation based on the trigger frame. The operations further include performing an uplink channel estimation based on the downlink channel estimation and sending data to the access point based on the uplink channel estimation.

According to another implementation of the disclosed techniques, a non-transitory computer-readable medium includes instructions for sending data. The instructions, when executed by a processor, cause the processor to perform operations including receiving, at a first station of a plurality of stations, a trigger frame from an access point of a wireless network. The operations also include performing a downlink channel estimation based on the trigger frame. The operations further include performing an uplink channel estimation based on the downlink channel estimation and sending data to the access point based on the uplink channel estimation.

According to another implementation of the disclosed techniques, an apparatus includes means for receiving a trigger frame at a first station of a plurality of stations from an access point of a wireless network. The apparatus also includes means for performing a downlink channel estimation based on the trigger frame. The apparatus further includes means for performing an uplink channel estimation based on the downlink channel estimation and means for sending data to the access point based on the uplink channel estimation.

According to another implementation of the disclosed techniques, a method for sending data includes receiving, at a first station of a plurality of stations, a trigger frame from an access point of a wireless network. The method also includes determining a downlink channel estimation based on the trigger frame and sending the downlink channel estimation to the access point. The method further includes receiving uplink channel data from the access point in response to sending the downlink channel estimation. The method also includes sending data to the access point based on the uplink channel data.

According to another implementation of the disclosed techniques, an apparatus includes a processor and a memory storing instructions that are executable by the processor to perform operations including receiving, at a first station of a plurality of stations, a trigger frame from an access point of a wireless network. The operations also include determining a downlink channel estimation based on the trigger frame and sending the downlink channel estimation to the access point. The operations further include receiving uplink channel data from the access point in response to sending the downlink channel estimation. The operations also include sending data to the access point based on the uplink channel data.

According to another implementation of the disclosed techniques, a non-transitory computer-readable medium includes instructions for sending data. The instructions, when executed by a processor, cause the processor to perform operations including receiving, at a first station of a plurality of stations, a trigger frame from an access point of a wireless network. The operations also include determining a downlink channel estimation based on the trigger frame and sending the downlink channel estimation to the access point. The operations further include receiving uplink channel data from the access point in response to sending the downlink channel estimation. The operations also include sending data to the access point based on the uplink channel data.

According to another implementation of the disclosed techniques, an apparatus includes means for receiving a trigger frame at a first station of a plurality of stations from an access point of a wireless network. The apparatus also includes means for determining a downlink channel estimation based on the trigger frame and means for sending the downlink channel estimation to the access point. The apparatus further includes means for receiving uplink channel data from the access point in response to sending the downlink channel estimation. The apparatus also includes means for sending data to the access point based on the uplink channel data.

V. BRIEF DESCRIPTION OF THE DRAWINGS

VI. DETAILED DESCRIPTION

Figure 1:
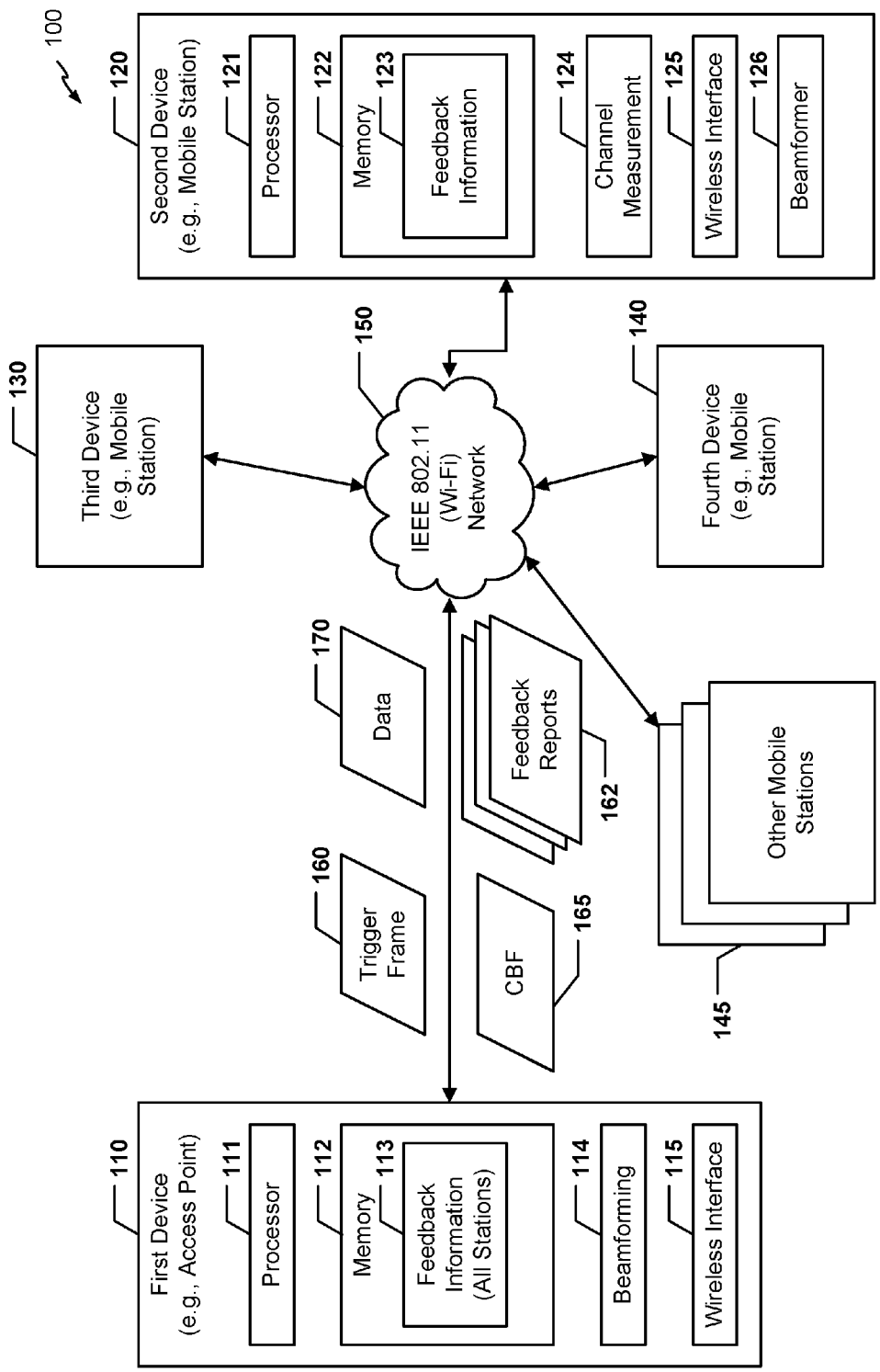
FIG. 1 is a diagram of a system that is operable to facilitate uplink beamforming.

Referring to FIG. 1, a system 100 that is operable to facilitate uplink beamforming is shown. The system 100 includes a first device 110 configured to wirelessly communicate with a plurality of mobile devices 120, 130, and 140 via a wireless network 150. According to one implementation, the first device 110 may be an access point and each mobile device of the plurality of mobile devices 120, 130, and 140 may be a mobile station (STA). The wireless network 150 may include and/or may be coupled to a plurality of devices, such as the devices 110, 120, 130, and 140, that are configured to communicate using a beamforming technique. However, in other implementations, the first device 110 may be configured to communicate using a beamforming technique. Particular devices in the wireless network 150 may be capable of acting as beamformers, acting as beamformees, or both. Beamformers may send beamformed data and beamformees may receive beamformed data.

In a particular implementation, the wireless network 150 is an Institute of Electrical and Electronics Engineers (IEEE) 802.11 wireless network or a "Wi-Fi" network. According to one implementation, the wireless network 150 operates in accordance with an IEEE 802.11 standard. In an illustrative implementation, the wireless network 150 is an 802.11ax network. The wireless network 150 may support multiple-user multiple-input-multiple-output (MU-MIMO) data transmission in both uplink (UL) and downlink (DL) directions. As used herein, UL communication refers to STA-to-AP communication, and DL communication refers to AP-to-STA communication. In a particular implementation, the wireless network 150 also supports UL and DL multiple access communication. For example, the wireless network 150 may also support UL and DL orthogonal frequency-division multiple access (OFDMA) communication.

In a particular implementation, the first device 110 includes a processor 111, a memory 112, and a wireless interface 115 configured to send and receive data via the wireless network 150. The processor 111 may include a central processing unit (CPU), a digital signal processor (DSP), a network processing unit (NPU), etc. The memory 112 may include a random access memory (RAM), a read-only memory (ROM), etc. The memory 112 may store feedback information 113 received from one or more stations within range of the first device 110. According to one implementation, the feedback information 113 may include channel state information. For example, the feedback information 113 may include coordinated beamforming (CBF) information that is determined using beamforming circuitry 114. As used herein, CBF information may include channel state information used by a beamformer to communicate using a beamforming technique. The feedback information 113 may be transmitted to the other devices 120, 130, and 140, as well as to other mobile stations 145 in the system 100, to facilitate uplink beamforming. Additional details with respect to CBF information, such as the feedback information 113, are described with respect to FIGS. 2-4.

The devices 120, 130, and 140, as well as the other mobile stations 145 in the system 100, may each include a processor, a memory, channel measurement circuitry, a wireless interface, and a beamformer. As a non-limiting example, the second device 120 may include a processor 121, a memory 122, channel measurement circuitry 124, a wireless interface 125, and a beamformer 126. According to one implementation, the beamformer 126 may be a transmitter that is operable to transmit data according to a beamforming technique. The channel measurement circuitry 124 may be configured to determine the feedback information 123, such as channel state information, which may be stored in the memory 122.

Figure 2:
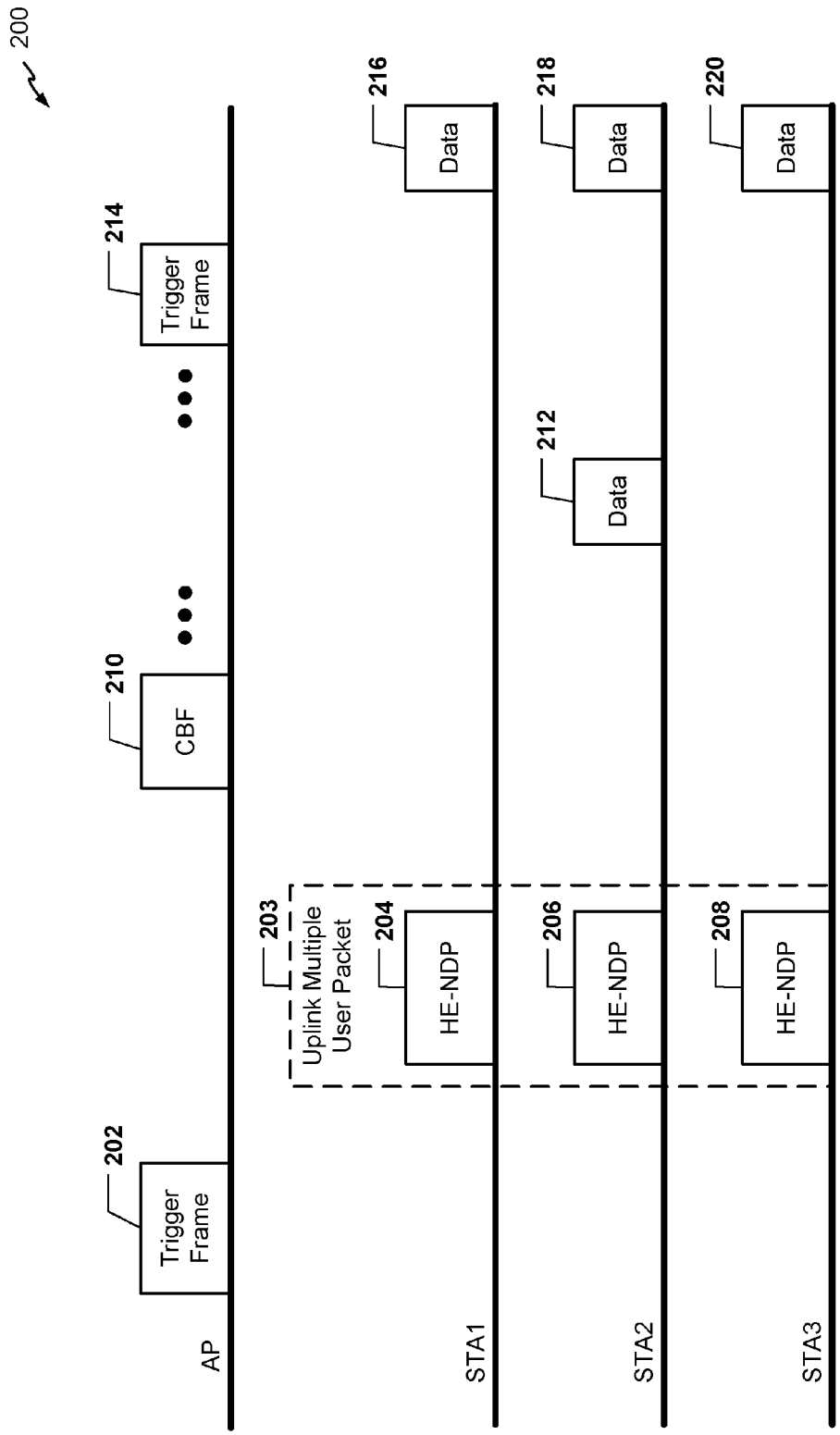
FIG. 2 is a timing diagram that illustrates an example of uplink beamforming.
Figure 3:
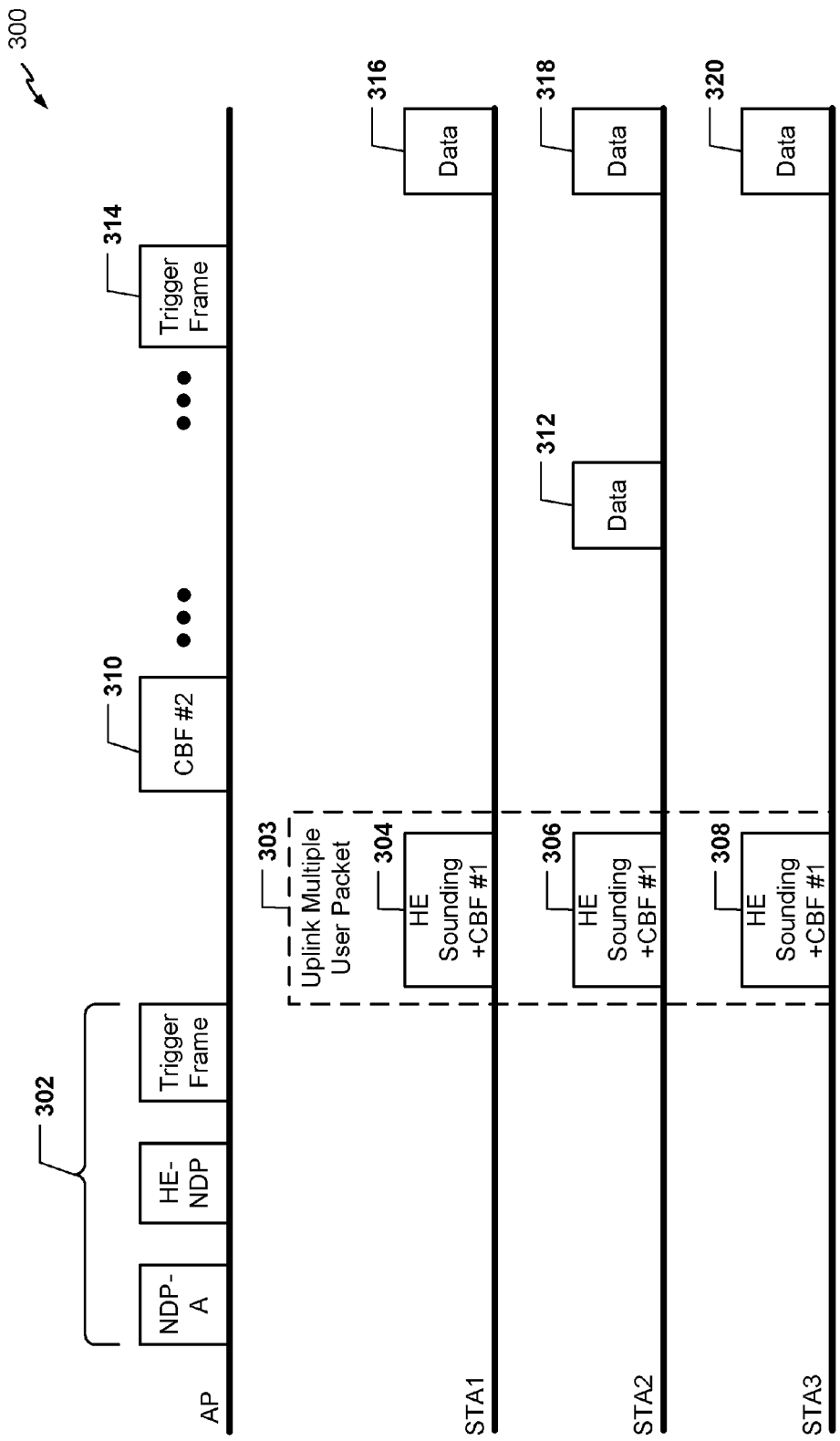
FIG. 3 is another timing diagram that illustrate an example of uplink beamforming.

During operation, the first device 110 may send a trigger frame 160 to the devices 120, 130, 140 and the other mobile stations 145 in the system 100, as described in greater detail with respect to FIGS. 2 and 3. In response to receiving the trigger frame 160, one or more of the devices 120, 130, 140 and the other stations 145 may perform channel measurement. For example, one or more of the devices 120, 130, 140 may perform downlink channel estimation in response to receiving the trigger frame 160. Each such device/station may provide feedback information to the first device 110 in a feedback report 162. In a particular implementation, only those stations that are part of at least one beamforming group provide a feedback report 162 to the first device 110. In a particular implementation, multiple stations provide feedback reports carrying an HE-sounding signal and/or CBF information, as further described with reference to FIG. 3. Based on the feedback report 162, the first device 110 may provide CBF information 165 to the other devices 120, 130, and 140. The CBF information 165 may include uplink channel measurements that enable the other devices 120, 130, and 140 to send data 170 to the first device 110 on the uplink using a beamforming technique, as described with respect to FIGS. 2 and 3. For example, the other devices 120, 130, and 140 may determine the uplink channel measurements based on the CBF information 165 and may send the data 170 to the first device 110 using beamforming techniques based on the uplink channel measurements. To illustrate, the beamformer 126 of the second device 120 may send the data 170 to the first device 110 using beamforming techniques based on an uplink channel measurement indicated in the CBF information 165. According to one implementation, the beamformer 126 may be a transmitter with beamforming capabilities.

Figure 4:
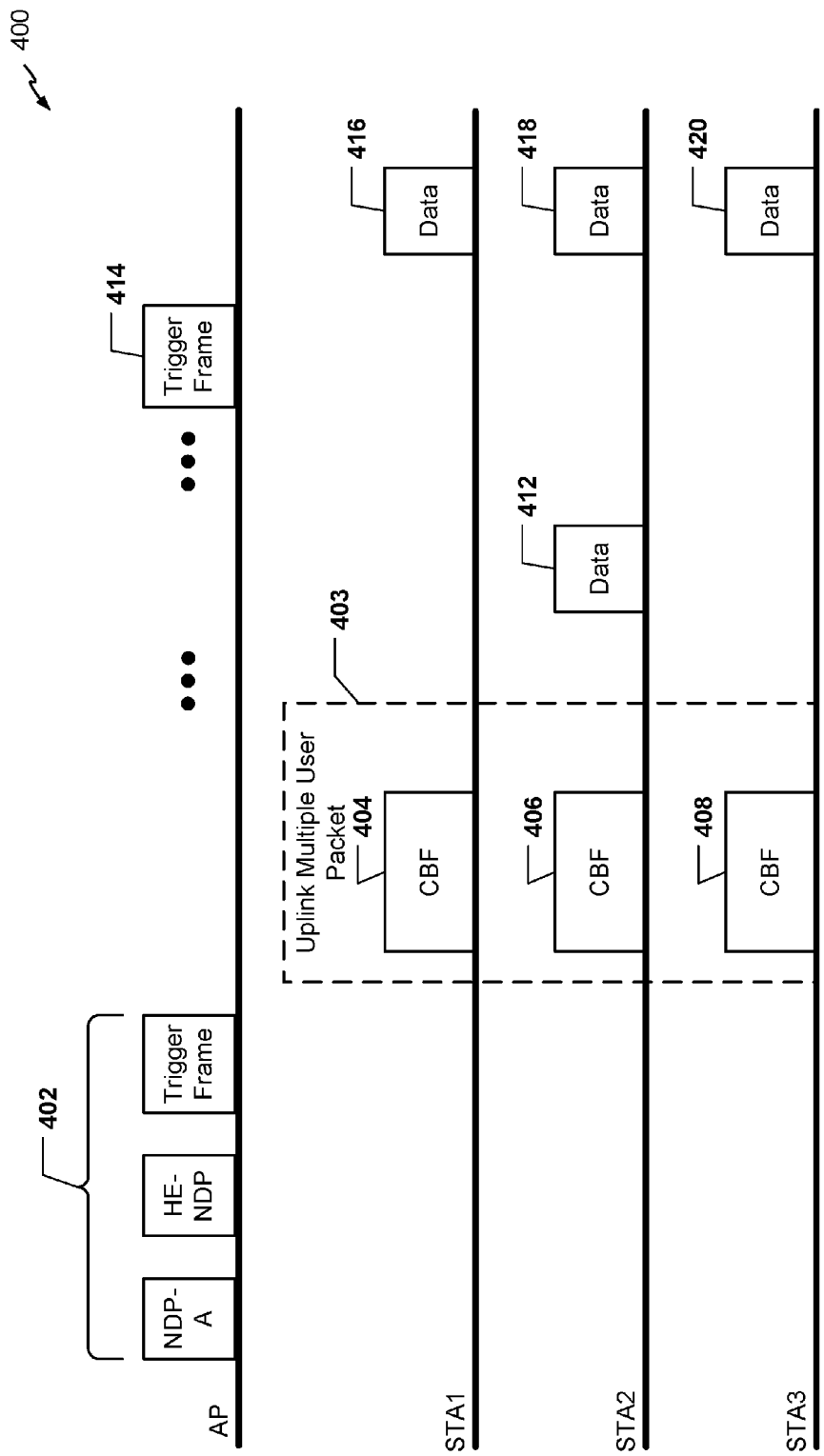
FIG. 4 is another timing diagram that illustrate an example of uplink beamforming.

According to some implementations, the other devices 120, 130, and 140 may send data 170 to the first device 110 using beamforming techniques in response to receiving the trigger frame 160, as described in greater detail with respect to FIG. 4. For example, the other devices may determine the DL channel estimate based on the trigger frame and may determine an uplink channel estimate based on the DL channel estimate. According to one implementation, the DL channel estimate may be based on NDP frames associated with the trigger frame 160. The UL channel estimate may be the "reverse" or the "reciprocal" of the DL channel estimate. The other devices 120, 130, and 140 may send data to the first device 110 on the uplink, as described with respect to FIG. 4.

Thus, the system 100 of FIG. 1 illustrates techniques for the devices 120, 130, and 140 to obtain uplink channel measurements or estimates to send data to the first device 110 on the uplink. For example, the devices 120, 130, and 140 may obtain the uplink channel measurements via the CBF information 165 provided by the first device. Alternatively, the devices 120, 130, and 140 may obtain the uplink channel measurements based on NDPs from the first device 110.

Referring to FIG. 2, a timing diagram 200 that illustrates an example of uplink beamforming is shown. In FIG. 2, a horizontal axis from left-to-right corresponds to time. The timing diagram of FIG. 2 illustrates uplink beamforming using explicit sounding. For example, uplink beamforming may be performed by mobile stations based on channel estimates indicated in coordinated beamforming information that is provided by an access point.

As shown in FIG. 2, an AP may transmit a trigger frame 202 to a plurality of mobile stations, such as the mobile stations designated "STA1," "STA2," and "STA3". According to one implementation, the AP may include the first device 110 of FIG. 1. The trigger frame 202 may correspond to the trigger frame 160 of FIG. 1. According to one implementation, the second device 120 of FIG. 1 corresponds to mobile station "STA1", the third wireless device 130 of FIG. 1 corresponds to mobile station "STA2", and the fourth wireless device 140 of FIG. 1 corresponds to mobile station "STA3". The trigger frame 202 may be used by the AP to schedule an uplink multiple user packet 203 according to an IEEE 802.11ax protocol. For example, the trigger frame 202 may indicate a time window for the stations to transmit the uplink multiple user packet 203.

The mobile stations may send high-efficiency null data packets (HE-NDPs) 204-208 to the AP using the scheduled uplink multiple user packet 203. For example, the mobile station "STA1" may send a first HE-NDP 204 to the AP via the uplink multiple user packet 203, the mobile station "STA2" may send a second HE-NDP 206 to the AP via the uplink multiple user packet 203, and the mobile station "STA3" may send a third HE-NDP 208 to the AP via the uplink multiple user packet 203. By sending the HE-NDPs 204-208 via the uplink multiple user packet 203, the airtime for sending the HE-NDPs 204-208 may be reduced in comparison to an IEEE 802.11ac/n protocol where a single mobile station transmits a single user packet on the uplink.

The uplink multiple user packet 203 (and the HE-NDPs 204-208) may be sent according to an uplink MU-MIMO transmission scheme, an uplink OFDMA transmission scheme, or a hybrid transmission scheme. For example, if the mobile stations are located in the same resource unit (RU), the uplink multiple user packet 203 (and the HE-NDPs 204-208) may be sent according to an uplink MU-MIMO transmission scheme. If the mobile stations are located in different RUs, the uplink multiple user packet 203 may be sent concurrently according to an uplink OFDMA transmission scheme. Additionally, up to eight long training fields (LTFs) may be included in the uplink multiple user packet 203 according to the IEEE 802.11ax protocol. Thus, if the number of mobile stations transmitting a sounding signal to the AP is less than or equal to eight, the mobile stations may send the HE-NDPs according to the MU-MIMO transmission scheme. If the number of mobile stations transmitting a sounding signal to the AP is greater than eight, the mobile stations may send the HE-NDPs according to the OFDMA transmission scheme.

The AP may determine or estimate an uplink channel measurement for each mobile station based on HE-NDPs 204-208 in the uplink multiple user packet 203 and may determine CBF information 210 for each mobile station based on the uplink channel measurements. According to one implementation, the CBF information 210 may include beamforming parameters for each mobile station. According to another implementation, the AP may send the CBF information 210 to each mobile station using a downlink OFDMA transmission scheme. According to another implementation, the AP may send the CBF information 210 to a single station using a downlink single user transmission scheme as opposed to a downlink OFDMA transmission scheme.

After the AP sends the CBF information 210 to each mobile station, each mobile station may perform uplink beamforming according to CBF information 210 associated with the particular mobile station. The mobile stations may perform uplink beamforming according to a single user transmission scheme, a MU-MIMO transmission scheme, or an OFDMA transmission scheme. For example, the mobile station "STA2" may send data 212 on the uplink to the AP according to the single user transmission scheme based on beamforming parameters indicated in the CBF information 210. As another example, the AP may send a trigger frame 214 to each mobile station. Upon receiving the trigger frame 214, the mobile stations may send data 216, 218, 220 on the uplink to the AP according to the MU-MIMO transmission scheme or according to the OFDMA transmission scheme based on beamforming parameters indicated in the CBF information 210.

The timing diagram 200 of FIG. 2 enables uplink beamforming from mobile stations for an IEEE 802.11ax protocol. For example, the mobile stations may provide HE-NDPs to the AP via the uplink multiple user packet 203. The AP may provide feedback, such as the CBF information 210, to the mobile stations in response to receiving the sounding signal in the uplink multiple user packet 203. The feedback may indicate uplink channel conditions to the mobile stations. Based on the feedback, such as the sounding feedback, the mobile stations may send data 212, 216, 218, 220 to the AP using one or more beamforming techniques based on the uplink channel conditions indicated in the CBF information 210.

Referring to FIG. 3, a timing diagram 300 that illustrates an example of uplink beamforming is shown. In FIG. 3, a horizontal axis from left-to-right corresponds to time. The timing diagram of FIG. 3 illustrates uplink beamforming using explicit sounding. For example, uplink beamforming may be performed by mobile stations based on uplink channel estimates that are determined by an access point and provided in coordinated beamforming information to the mobile stations.

As shown in FIG. 3, an AP may transmit one or more frames 302 to a plurality of mobile stations, such as the mobile stations designated "STA1," "STA2," and "STA3". According to one implementation, the AP may include the first device 110 of FIG. 1. The frame(s) 302 may include the trigger frame 160 of FIG. 1. The frame(s) 302 may include a null data packet announcement (NDP-A) frame, a HE-NDP frame, and a trigger frame. The NDP-A frame, the HE-NDP frame, and the trigger frame may be combined into one or two frames. According to one implementation, the second device 120 of FIG. 1 corresponds to mobile station "STA1", the third wireless device 130 of FIG. 1 corresponds to mobile station "STA2", and the fourth wireless device 140 of FIG. 1 corresponds to mobile station "STA3".

The trigger frame may be used to schedule an uplink multiple user packet 303 according to an IEEE 802.11ax protocol. The uplink multiple user packet 303 may support HE sounding functionality and include CBF information (CBF #1) 304, 306, 308 that is used by the AP to send CBF information (CBF #2) 310, as described below. The CBF information (CBF #2) 310 may correspond to a frame or packet that includes coordinated beamforming information. Each mobile station may use the NDP-A frame and the HE-NDP frame for downlink sounding to generate the CBF information (CBF #1) 304, 306, 308. The CBF information (CBF #1) 304, 306, 308 may include or indicate downlink channel estimates.

The mobile stations may send the HE sounding signal and CBF information (CBF #1) 304, 306, 308 to the AP using the scheduled uplink multiple user packet 303. For example, the mobile station "STA1" may send a first HE sounding signal and CBF information (CBF #1) 304 to the AP via the uplink multiple user packet 303, the mobile station "STA2" may send a second HE sounding signal and CBF information (CBF #1) 306 to the AP via the uplink multiple user packet 303, and the mobile station "STA3" may send a third HE sounding signal and CBF information (CBF #1) 308 to the AP via the uplink multiple user packet 303. By sending the HE sounding signal and CBF information (CBF #1) 304, 306, 308 via the uplink multiple user packet 303, the airtime for sending the HE sounding signal and CBF information (CBF #1) 304, 306, 308 may be reduced in comparison to an IEEE 802.11ac/n protocol where a single mobile station at a time transmits a single user packet on the uplink.

The uplink multiple user packet 303 may be sent according to an uplink MU-MIMO transmission scheme, an uplink OFDMA transmission scheme, or a hybrid transmission scheme. For example, if the mobile stations are located in the same resource unit (RU), the uplink multiple user packet 303 may be sent according to an uplink MU-MIMO transmission scheme. If the mobile stations are located in different RUs, the uplink multiple user packet 303 may be sent concurrently according to an uplink OFDMA transmission scheme. Additionally, up to eight LTFs may be included in the uplink multiple user packet 303 according to the IEEE 802.11ax protocol. Thus, if the number of mobile stations transmitting a sounding signal to the AP is less than or equal to eight, the mobile stations may send the uplink multiple user packet 303 according to the MU-MIMO transmission scheme. If the number of mobile stations transmitting a sounding signal to the AP is greater than eight, the mobile stations may send the uplink multiple user packet 303 according to the OFDMA transmission scheme.

The mobile stations may perform downlink channel measurements or estimations and send CBF information (CBF#1) associated with the downlink channel estimations to the AP using the uplink multiple user packet 303. The AP may determine an uplink channel measurement for each mobile station based on the HE sounding signal in the uplink multiple user packet 303 and may determine CBF information (CBF #2) 310 for each mobile station based on the uplink channel measurements. According to one implementation, the CBF information (CBF #2) 310 may include beamforming parameters for each mobile station to perform uplink beamforming. The AP may send the CBF information (CBF #2) 310 to each mobile station using a downlink MU-MIMO transmission scheme. The downlink MU-MIMO transmission scheme may be based on the CBF information (CBF#1) carried in the uplink multiple user packet 303.

After the AP sends the CBF information (CBF #2) 310 to each mobile station, each mobile station may perform uplink beamforming according to CBF information (CBF #2) 310 associated with the particular mobile station. The mobile stations may perform uplink beamforming according to a single user transmission scheme, a MU-MIMO transmission scheme, or an OFDMA transmission scheme. For example, the mobile station "STA2" may send data 312 on the uplink to the AP according to the single user transmission scheme. As another example, the AP may send a trigger frame 314 to each mobile station. Upon receiving the trigger frame, the mobile stations may send data 316, 318, 320 on the uplink to the AP according to the MU-MIMO transmission scheme or according to the OFDMA transmission scheme.

The timing diagram 300 of FIG. 3 enables uplink beamforming from mobile stations for an IEEE 802.11ax protocol. For example, the mobile stations may provide a sounding signal and CBF information to the AP via the uplink multiple user packet 303. The AP may provide feedback, such as the CBF information 310, to the mobile stations in response to receiving the sounding signal. Based on the sounding feedback, the mobile stations may send data 312, 316, 318, 320 on the uplink to the AP.

Referring to FIG. 4, a timing diagram 400 that illustrates an example of uplink beamforming is shown. In FIG. 4, a horizontal axis from left-to-right corresponds to time. The timing diagram of FIG. 4 illustrates uplink beamforming using implicit sounding. For example, uplink beamforming may be performed by mobile stations based on downlink channel estimates at the mobile stations.

As shown in FIG. 4, an AP may transmit one or more frames 402 to a plurality of mobile stations, such as the mobile stations designated "STA1," "STA2," and "STA3". According to one implementation, the AP may correspond to the first device 110 of FIG. 1. The frame(s) 402 may correspond to the trigger frame 160 of FIG. 1. The frame(s) 402 may include a NDP-A frame, a HE-NDP frame, and a trigger frame. The NDP-A frame, the HE-NDP frame, and the trigger frame may be combined into one or two frames. According to one implementation, the second device 120 of FIG. 1 corresponds to mobile station "STA1", the third wireless device 130 of FIG. 1 corresponds to mobile station "STA2", and the fourth wireless device 140 of FIG. 1 corresponds to mobile station "STA3".

The trigger frame may be used to schedule an uplink multiple user packet 403 according to an IEEE 802.11ax protocol. The uplink multiple user packet 403 may include CBF information 404, 406, 408 that indicates a downlink channel estimate for the respective mobile station based on the NDP-A frame and the HE-NDP frame. For example, each mobile station may use the NDP-A frame and the HE-NDP frame to estimate the downlink channel and to generate the CBF information 404, 406, 408.

The mobile stations may send the CBF information 404, 406, 408 to the AP using the scheduled uplink multiple user packet 403. For example, the mobile station "STA1" may send first CBF information 404 to the AP via the uplink multiple user packet 403, the mobile station "STA2" may send second CBF information 406 to the AP via the uplink multiple user packet 403, and the mobile station "STA3" may send third CBF information 408 to the AP via the uplink multiple user packet 403. The CBF information 404, 406, 408 may be sent to the AP on the uplink based on implicit sounding. For example, each mobile station may estimate uplink channel measurements based on the downlink channel estimates determined from the received NDP-A frame and HE-NDP frame. As a non-limiting example, the uplink channel estimate may be a "reverse" or a "reciprocal" of the downlink channel estimate. Each mobile station may perform uplink beamforming based on the uplink channel estimate to send the CBF information 404, 406, 408 to the AP according to a MU-MIMO transmission scheme or an OFDMA transmission scheme.

Each mobile station may perform uplink beamforming according to uplink channel estimate (based on implicit sounding). The mobile stations may perform uplink beamforming according to a single user transmission scheme, a MU-MIMO transmission scheme, or an OFDMA transmission scheme. For example, the mobile station "STA2" may send data 412 on the uplink to the AP according to the single user transmission scheme. As another example, the AP may send a trigger frame 414 to each mobile station. Upon receiving the trigger frame, the mobile stations may send data 416, 418, 420 on the uplink to the AP according to the MU-MIMO transmission scheme or according to the OFDMA transmission scheme.

The timing diagram 400 of FIG. 4 enables uplink beamforming from mobile stations for an IEEE 802.1 lax protocol. By using the reverse of the downlink channel estimate as the uplink channel estimate, the mobile stations may more efficiently send data to the AP on the uplink. For example, the mobile stations may send data to the AP without waiting for feedback or CBF information from the AP.

Figure 5:
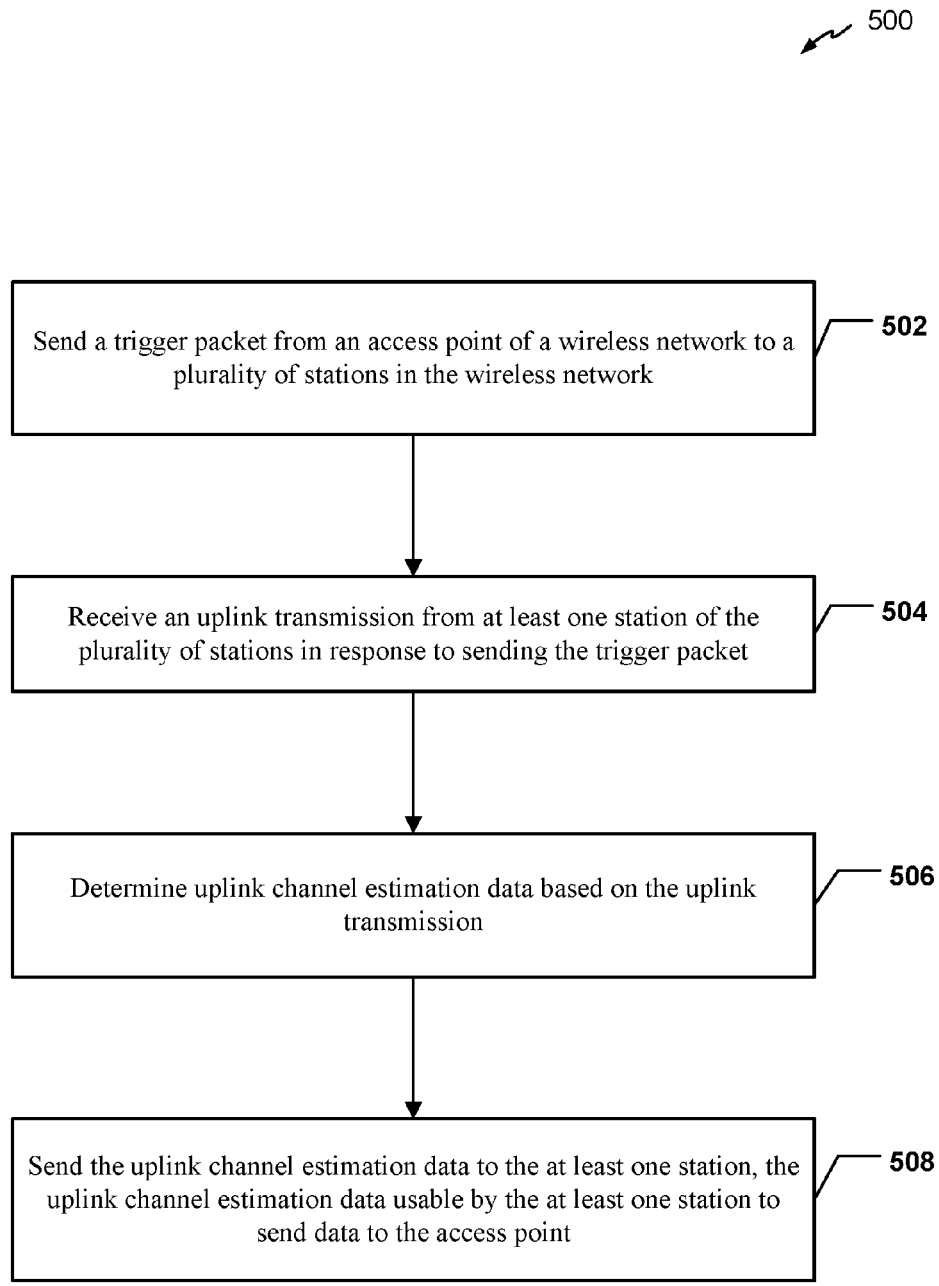
FIG. 5 is a flowchart to illustrate a particular implementation of a method for determining uplink channel information.

Referring to FIG. 5, a flowchart to illustrate a method 500 for determining uplink channel information is shown. The method 500 may be performed by the first device 110 of FIG. 1.

The method 500 may include sending a trigger frame from an access point of a wireless network to a plurality of station in the wireless network, at 502. For example, referring to FIG. 1, the first device 110 may send the trigger frame 160 to the devices 120, 130, and 140 of the wireless network 150. To illustrate, the APs of FIGS. 2 and 3 may send the trigger frames 202, 302, respectively, to each mobile station.

An uplink transmission may be received from at least one station of the plurality of stations in response to sending the trigger frame, at 504. For example, referring to FIG. 1, the first device 110 may receive feedback reports 162 from each device 120, 130, and 140. The feedback reports may be received via an uplink transmission. According to the timing diagram 200 of FIG. 2, the mobile stations may send the uplink multiple user packet 203 to the AP. According to the timing diagram 300 of FIG. 3, the mobile stations may send the uplink multiple user packet 303 to the AP.

Uplink channel data may be determined based on the uplink transmission, at 506. For example, referring to FIG. 1, the first device 110 may measure the uplink channel based on the feedback reports 162 and generate the CBF information 165 indicating the uplink measurements. For example, the first device 110 may perform an uplink estimation based on the downlink channel estimation in the feedback reports 162. According to the timing diagram 200 of FIG. 2, the AP may generate the CBF information 210 based on the uplink multiple user packet 203. According to the timing diagram 300 of FIG. 3, the AP may generate the CBF information (CBF #2) 310 based on the uplink multiple user packet 303.

The uplink channel data may be sent to the at least one station, at 508. The uplink channel data may be usable by the at least one station to send data to the access point. For example, referring to FIG. 1, the first device 110 may send the CBF information 165 to the other devices 120, 130, and 140. The CBF information 165 may be usable by the other devices 120, 130, and 140 to send data to the first device 110. According to the timing diagram 200, 300 of FIGS. 2 and 3, the AP may send the CBF information 210, 310, respectively, to the mobile stations.

According to one implementation, the wireless network may operate in accordance with an Institute of Electrical and Electronics Engineers (IEEE) 802.11ax protocol. The uplink transmission may include an uplink multiple user packet. The uplink multiple user packet may include a high-efficiency null data packet (HE-NDP) from each station of the plurality of stations. The trigger frame may include one or more null data packets (NDPs), and the uplink multiple user packet may include a high-efficiency sounding signal and coordinated beamforming information.

The uplink channel data may include coordinated beamforming information that is sent according to a multiple-user multiple-input-multiple-output (MU-MIMO) transmission scheme. The uplink multiple user packet may be transmitted according to a multiple-user multiple-input-multiple-output (MU-MIMO) transmission scheme, an orthogonal frequency division multiple access (OFDMA) transmission scheme, or a combination thereof.

According to one implementation, the uplink channel data includes coordinated beamforming information. The coordinated beamforming information may be sent according to an orthogonal frequency division multiple access (OFDMA) transmission scheme or a single-user transmission scheme.

The method 500 of FIG. 5 may enable an AP to perform an uplink channel estimation based on an uplink transmission from one or more mobile stations. Data corresponding to the uplink channel estimation may be provided to the mobile stations such that the stations may send data to the AP based on the uplink channel estimation.

Figure 6:
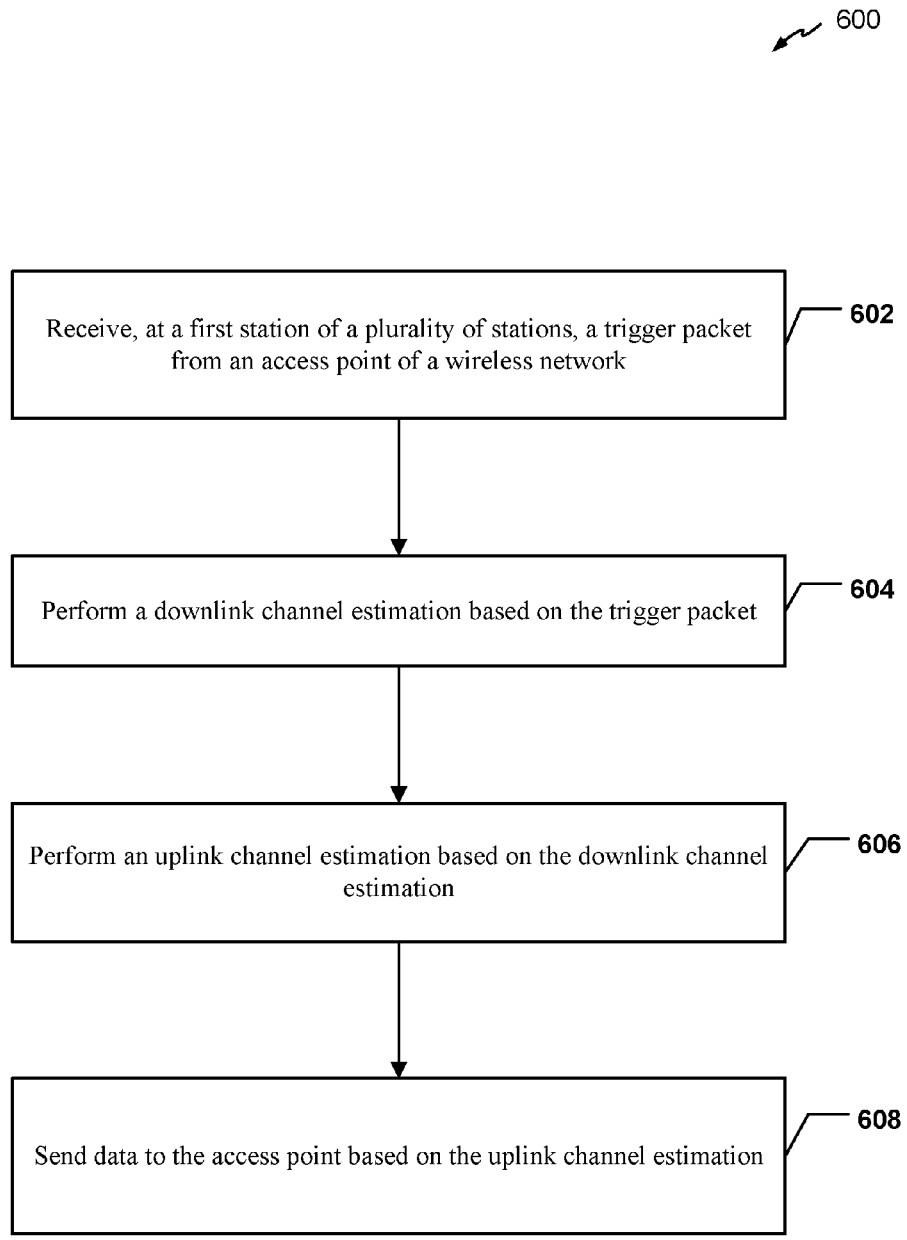
FIG. 6 is a flowchart to illustrate a particular implementation of a method for beamforming data.

Referring to FIG. 6, a flowchart to illustrate a method 600 for beamforming data is shown. The method 600 may be performed by the second device 120 of FIG. 1. The method 600 may enable the second device to transmit the data 170 to the first device 110 using a beamforming technique.

The method 600 may include receiving, at a first station of a plurality of stations, a trigger frame from an access point of a wireless network, at 602. For example, referring to FIG. 1, the second device 120 may receive the trigger frame 160 from the first device 110 of the wireless network 150. According to the timing diagram 400 of FIG. 4, the mobile stations may receive the one or more frames 402 from the AP. The one or more frames 402 may include the NDP-A frame, the HE-NDP-frame, and the trigger frame.

A downlink channel estimation may be performed based on the trigger frame, at 604. For example, referring to FIG. 1, the second device 120 may perform downlink channel estimation based on the trigger frame 160. To illustrate, the mobile stations in the timing diagram 400 of FIG. 4 may perform downlink channel estimation based on the one or more frames 402 sent from the AP. For example, the mobile stations may estimate the downlink channel based on the received NDP-A frame and the received HE-NDP frame.

An uplink channel estimation may be performed based on the downlink channel estimation, at 606. For example, referring to FIG. 1, the second device 120 may perform uplink channel estimation based on the downlink channel estimation. To illustrate, the mobile stations in the timing diagram 400 of FIG. 4 may estimate the uplink (and generate the CBF information 404, 406, 408) based on the downlink channel estimation. For example, the mobile stations may determine that the uplink channel estimation is the "reverse" or "reciprocal" of the downlink channel estimation.

CBF information and/or data may be sent to the access point based on the uplink channel estimation, at 608. For example, referring to FIG. 1, the second device 120 may send feedback reports and/or data to the first device 110 using a beamforming technique based on the uplink channel estimation. To illustrate, the mobile stations in the timing diagram 400 of FIG. 4 may send the CBF information 404, 406, 408 and/or data 412, 416, 418, 420 to the AP based on the uplink channel estimation.

The method 600 of FIG. 6 may enable uplink beamforming from mobile stations for an IEEE 802.11ax protocol. For example, the mobile stations estimate an uplink channel based on downlink channel estimations based on NDPs received from the AP via the downlink. As a non-limiting example, the mobile stations may determine that the uplink channel estimation is the "reverse" or "reciprocal" of the downlink channel estimation. The mobile stations may send CBF information and/or data to the AP using a beamforming technique based on the uplink channel estimation.

According to one implementation, the wireless network may operate in accordance with an Institute of Electrical and Electronics Engineers (IEEE) 802.11ax protocol. The trigger frame may include one or more null data packets (NDPs). The channel estimation may be based on a reciprocal of the downlink channel estimation. The data may include at least coordinated beamforming information.

Figure 7:
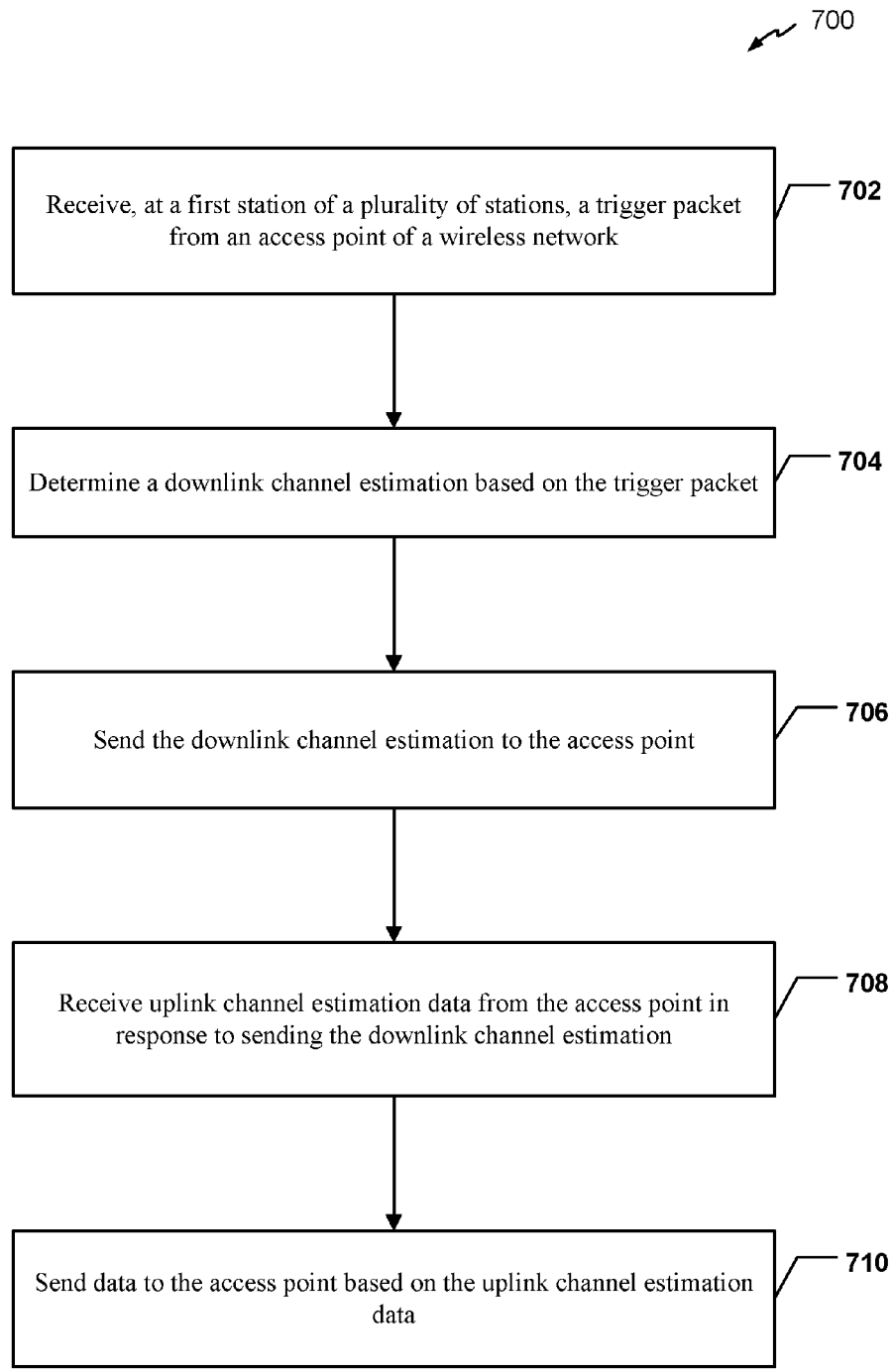
FIG. 7 is a flowchart to illustrate another particular implementation of a method for beamforming data.

Referring to FIG. 7, a flowchart to illustrate a method 700 for beamforming data is shown. The method 700 may be performed by the second device 120 of FIG. 1.

The method 700 may include receiving, at a first station of a plurality of stations, a trigger frame from an access point of a wireless network, at 702. For example, referring to FIG. 1, the second device 120 may receive the trigger frame 160 from the first device 110 of the wireless network 150. To illustrate, the mobile stations in the timing diagram 200, 300 of FIGS. 2 and 3 may receive the frames 202, 302, respectively, from the AP.

A downlink channel estimation may be determined based on the trigger frame, at 704. For example, referring to FIG. 1, the second device 120 may determine a downlink channel estimation based on the trigger frame 160 using the channel measurement circuitry 124. To illustrate, the mobile stations in the timing diagram 200, 300 of FIGS. 2 and 3 may perform downlink channel estimation based on the one or more frames 202, 302, respectively, sent from the AP. For example, the mobile stations may estimate the downlink channel based on the received NDP-A frame and the received HE-NDP frame.

The downlink channel estimation may be sent to the access point, at 706. For example, referring to FIG. 1, the second device 120 may send the feedback report 162 to the first device 110. The feedback report may include a downlink channel estimation based on the trigger frame 160. Uplink channel data may be received from the access point in response to sending the downlink channel estimation, at 708. For example, referring to FIG. 1, the second device 120 may receive the CBF information 165 form the first device 110 in response to sending the feedback report 162 to the first device 110.

Data may be sent to the access point based on the uplink channel data, at 710. For example, referring to FIG. 1, the second device 120 may send data to the first device based on the uplink channel data indicated in the CBF information 165.

According to one implementation, the wireless network may operate in accordance with an Institute of Electrical and Electronics Engineers (IEEE) 802.11ax protocol. The downlink channel estimation may be sent using an uplink multiple user packet. The uplink multiple user packet may be transmitted according to a multiple-user multiple-input-multiple-output (MU-MIMO) transmission scheme, an orthogonal frequency division multiple access (OFDMA) transmission scheme, or a combination thereof. The uplink multiple user packet may include a high-efficiency sounding signal, coordinating beamforming information, or a combination thereof.

According to one implementation, the trigger frame may include one or more null data packets (NDPs). The uplink channel data may include coordinated beamforming information. The coordinated beamforming information may be transmitted according to a multiple-user multiple-input-multiple-output (MU-MIMO) transmission scheme. According to another implementation, the coordinated beamforming information may be transmitted according to an orthogonal frequency division multiple access (OFDMA) transmission scheme or a single-user transmission scheme.

The method 700 of FIG. 7 may enable uplink beamforming from mobile stations for an IEEE 802.11ax protocol. For example, the mobile stations may provide HE-NDPs to the AP. The AP may provide feedback to the mobile stations in response to receiving the HE sounding signal. Based on the sounding feedback, the mobile stations may send data on the uplink to the AP.

It should be noted that the order of steps illustrated in FIGS. 5-7 is for illustrative purposes only, and is not to be considered limiting. In alternative implementations, certain steps may be performed in a different order and/or may be performed concurrently (or at least partially concurrently).

Figure 8:
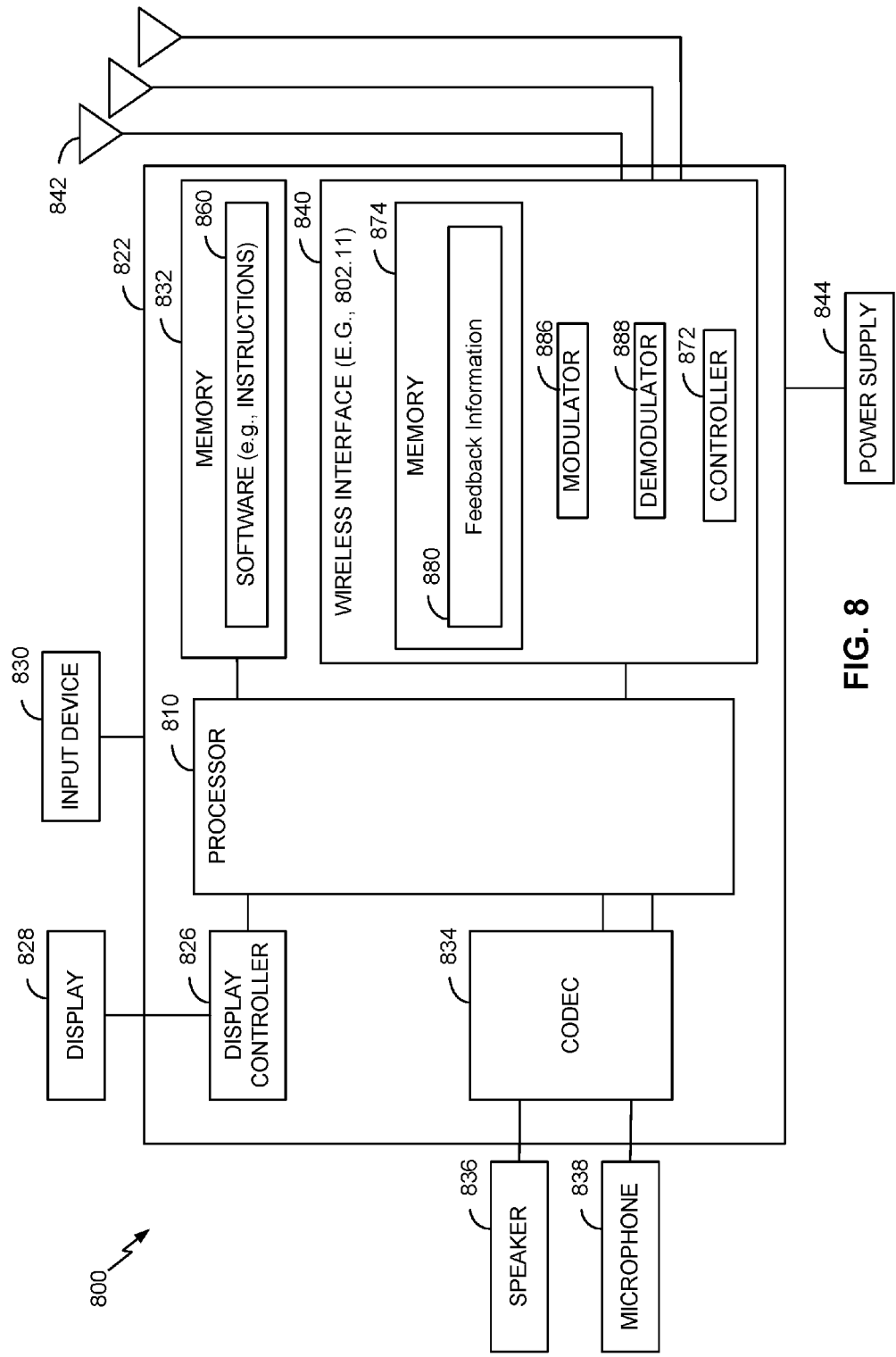
FIG. 8 is a diagram of a wireless device that is operable to support various implementations of one or more methods, systems, apparatuses, and/or computer-readable media disclosed herein.

Referring to FIG. 8, a block diagram of a particular illustrative implementation of a wireless communication device is depicted and generally designated 800. The device 800 may be a wireless electronic device and may include a processor 810, such as a digital signal processor (DSP), coupled to a memory 832. In an illustrative implementation, the device 800 may be the first device 110 of FIG. 1, one of the devices 120, 130, or 140 of FIG. 1, or one of the mobile stations 145 of FIG. 1.

The processor 810 may be configured to execute software 860 (e.g., a program of one or more instructions) stored in the memory 832. Additionally or alternatively, the processor 810 may be configured to implement one or more instructions stored in a memory 874 of a wireless interface 840, as described further herein. In a particular implementation, the processor 810 may be configured to operate in accordance with one or more of operations or methods described with reference to FIGS. 1-7.

A wireless interface 840 may be coupled to the processor 810 and to one or more antennas 842 such that wireless data received via the one or more antennas 842 and the wireless interface 840 may be provided to the processor 810. For example, the wireless interface 840 may include or correspond to the wireless interface 115 of FIG. 1 or the wireless interface 125 of FIG. 1. The wireless interface 840 may include the memory 874 and a controller 872. The memory 874 may include feedback information 880, such as the feedback information 113 or 123 of FIG. 1. In a particular implementation, the wireless interface 840 may also include a modulator 886 and a demodulator 888 for uplink and downlink communication, respectively.

The controller 872 may be configured to interface with the processor 810 to execute one or more instructions stored in the memory 874. The controller 872 may also be configured to interface with the processor 810 to execute the modulator 886 and/or the demodulator 888. Additionally or alternatively, the controller 872 may include a processor configured to execute one or more of the instructions stored in the memory 874. The wireless interface 840 and/or the processor 810 may also be configured to perform encoding and decoding operations, such as fast Fourier transform (FFT) and inverse FFT (IFFT) operations, beamforming, channel measurement, etc.

In a particular implementation, the processor 810, the display controller 826, the memory 832, the CODEC 834, and the wireless interface 840 are included in a system-in-package or system-on-chip device 822. In a particular implementation, an input device 830 and a power supply 844 are coupled to the system-on-chip device 822. Moreover, in a particular implementation, as illustrated in FIG. 8, the display device 828, the input device 830, the speaker 836, the microphone 838, the one or more antennas 842, and the power supply 844 are external to the system-on-chip device 822. However, each of the display device 828, the input device 830, the speaker 836, the microphone 838, the one or more antennas 842, and the power supply 844 can be coupled to one or more components of the system-on-chip device 822, such as one or more interfaces or controllers.

One or more of the disclosed implementations may be implemented in a system or an apparatus, such as the device 800, that may include a communications device, a fixed location data unit, a mobile location data unit, a mobile phone, a cellular phone, a satellite phone, a computer, a tablet, a portable computer, or a desktop computer. Additionally, the device 800 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof.

Although one or more of FIGS. 1-8 may illustrate systems, apparatuses, and/or methods according to the teachings of the disclosure, the disclosure is not limited to these illustrated systems, apparatuses, and/or methods. Implementations of the disclosure may be suitably employed in any device that includes integrated circuitry including memory, a processor, and on-chip circuitry.

In conjunction with the described implementations, a first apparatus includes means for sending a trigger frame from an access point of a wireless network to a plurality of stations in the wireless network. For example, the means for sending the trigger frame may include the wireless interface 115 of FIG. 1, the wireless interface 840 (or a component thereof) of FIG. 8, another device configured to send the trigger frame, or a combination thereof.

The first apparatus may also include means for receiving an uplink transmission from at least one station of the plurality of stations in response to sending the trigger frame. For example, the means for receiving the uplink transmission may include the wireless interface 115 of FIG. 1, the wireless interface 840 (or a component thereof) of FIG. 8, another device configured to receive the uplink transmission, or a combination thereof.

The first apparatus may also include means for determining uplink channel data based on the uplink transmission. For example, the means for determining the uplink channel data may include the processor 111 of FIG. 1, the processor 810 of FIG. 8, another device configured to determine the uplink channel data, or a combination thereof.

The first apparatus may also include means for sending the uplink channel data to the at least one station. The uplink channel data may be usable by the at least one station to send data to the access point. For example, the means for sending the uplink channel data may include the wireless interface 115 of FIG. 1, the wireless interface 840 (or a component thereof) of FIG. 8, another device configured to send the uplink channel data, or a combination thereof.

In conjunction with the described implementations, a second apparatus includes means for receiving a trigger frame at a first station of a plurality of stations from an access point of a wireless network. For example, the means for receiving the trigger frame may include the wireless interface 125 of FIG. 1, the wireless interface 840 (or a component thereof) of FIG. 8, another device configured to receive the trigger frame, or a combination thereof.

The second apparatus may also include means for performing a downlink channel estimation based on the trigger frame. For example, the means for performing the downlink channel estimation may include the channel measurement circuitry 124 of FIG. 1, the processor 121 of FIG. 1, the processor 810 of FIG. 8, another device configured to perform the downlink channel estimation, or a combination thereof.

The second apparatus may also include means for performing an uplink channel estimation based on the downlink channel estimation. For example, the means for performing the uplink channel estimation may include the processor 121 of FIG. 1, the processor 810 of FIG. 8, another device configured to perform the uplink channel estimation, or a combination thereof.

The second apparatus may also include means for sending data to the access point based on the uplink channel estimation. For example, the means for sending the data may include the wireless interface 125 of FIG. 1, the wireless interface 840 (or a component thereof) of FIG. 8, another device configured to send the data, or a combination thereof.

In conjunction with the described implementations, a third apparatus includes means for receiving a trigger frame at a first station of a plurality of stations from an access point of a wireless network. For example, the means for receiving the trigger frame may include the wireless interface 125 of FIG. 1, the wireless interface 840 (or a component thereof) of FIG. 8, another device configured to receive the trigger frame, or a combination thereof.

The third apparatus may also include means for determining a downlink channel estimation based on the trigger frame. For example, the means for determining the downlink channel estimation may include the channel measurement circuitry 124 of FIG. 1, the processor 121 of FIG. 1, the processor 810 of FIG. 8, another device configured to determine the downlink channel estimation, or a combination thereof.

The third apparatus may also include means for sending the downlink channel estimation to the access point. For example, the means for sending the downlink channel estimation to the access point may include the wireless interface 125 of FIG. 1, the wireless interface 840 (or a component thereof) of FIG. 8, another device configured to send the downlink channel estimation to the access point, or a combination thereof.

The third apparatus may also include means for receiving uplink channel data from the access point in response to sending the downlink channel estimation. For example, the means for receiving the uplink channel data may include the wireless interface 125 of FIG. 1, the wireless interface 840 (or a component thereof) of FIG. 8, another device configured to receive the uplink channel data, or a combination thereof.

The third apparatus may also include means for sending data to the access point based on the uplink channel data. For example, the means for sending the data may include the wireless interface 125 of FIG. 1, the wireless interface 840 (or a component thereof) of FIG. 8, another device configured to send the data, or a combination thereof.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A method of beamforming data, the method comprising:
   receiving, at a first station of a plurality of stations, a trigger frame from an access point of a wireless network;
   performing, at the first station, a downlink channel estimation based on the trigger frame;
   determining, at the first station, uplink beamforming parameters based at least in part on the downlink channel estimation, wherein determining the uplink beamforming parameters comprises:
      determining a reverse of the downlink channel estimation to generate an uplink channel estimate; and
      determining the uplink beamforming parameters based on the uplink channel estimate; and
   sending data from the first station to the access point based on the uplink beamforming parameters.

2. The method of claim 1, wherein the wireless network operates in accordance with an Institute of Electrical and Electronics Engineers 802.11ax protocol.

3. The method of claim 1, wherein the trigger frame comprises one or more null data packets.

4. An apparatus comprising:
   a processor; and
   a memory storing instructions executable by the processor to perform operations comprising:
      receiving, at a first station of a plurality of stations, a trigger frame from an access point of a wireless network;
      performing, at the first station, a downlink channel estimation based on the trigger frame;
      determining, at the first station, uplink beamforming parameters based at least in part on the downlink channel estimation, wherein determining the uplink beamforming parameters comprises:
         determining a reverse of the downlink channel estimation to generate an uplink channel estimate; and
         determining the uplink beamforming parameters based on the uplink channel estimate; and
      sending data from the first station to the access point based on the uplink beamforming parameters.

5. The apparatus of claim 4, wherein the wireless network operates in accordance with an Institute of Electrical and Electronics Engineers 802.11ax protocol.

6. The apparatus of claim 4, wherein the trigger frame comprises one or more null data packets.

7. The method of claim 1, wherein the data from the first station comprises coordinated beamforming information.

8. The method of claim 7, wherein the coordinated beamforming information is transmitted according to a multiple-user multiple-input-multiple-output transmission scheme.

9. The method of claim 7, wherein the coordinated beamforming information is transmitted according to an orthogonal frequency division multiple access transmission scheme or a single-user transmission scheme.

10. The apparatus of claim 4, wherein the data from the first station comprises coordinated beamforming information.

11. The apparatus of claim 10, wherein the coordinated beamforming information is transmitted according to a multiple-user multiple-input-multiple-output transmission scheme.

12. The apparatus of claim 10, wherein the coordinated beamforming information is transmitted according to an orthogonal frequency division multiple access transmission scheme or a single-user transmission scheme.

13. The method of claim 1, wherein the trigger frame includes a null data packet frame, wherein the downlink channel estimation is performed based on the null data packet frame, and wherein the uplink beamforming parameters are based on the downlink channel estimation of the null data packet frame.

14. The method of claim 13, wherein the downlink channel estimation is used to determine coordinated beamforming information.

15. A station comprising:
   means for receiving a trigger frame from an access point of a wireless network;
   means for performing a downlink channel estimation based on the trigger frame;
   means for determining uplink beamforming parameters based at least in part on the downlink channel estimation, wherein determining the uplink beamforming parameters comprises:
      determining a reverse of the downlink channel estimation to generate an uplink channel estimate; and
      determining the uplink beamforming parameters based on the uplink channel estimate; and
   means for sending data to the access point based on the uplink beamforming parameters.

16. The station of claim 15, wherein the wireless network operates in accordance with an Institute of Electrical and Electronics Engineers 802.11ax protocol.

17. The station of claim 15, wherein the trigger frame comprises one or more null data packets.

* * * * *